Oct. 19, 1943.   J. P. CLIFFORD   2,332,438
AUTOMATIC WEIGHING MACHINE
Filed Dec. 26, 1939   4 Sheets-Sheet 1

Fig. 1.

Inventor
JOHN P. CLIFFORD
By Norris + Bateman
Attorneys

Oct. 19, 1943.  J. P. CLIFFORD  2,332,438
AUTOMATIC WEIGHING MACHINE
Filed Dec. 26, 1939  4 Sheets-Sheet 2

Inventor
JOHN P. CLIFFORD
By
Attorneys

Oct. 19, 1943.  J. P. CLIFFORD  2,332,438
AUTOMATIC WEIGHING MACHINE
Filed Dec. 26, 1939  4 Sheets-Sheet 3

Inventor
JOHN P. CLIFFORD

Oct. 19, 1943.   J. P. CLIFFORD   2,332,438
AUTOMATIC WEIGHING MACHINE
Filed Dec. 26, 1939   4 Sheets-Sheet 4

Inventor
JOHN P. CLIFFORD
By
Attorneys

Patented Oct. 19, 1943

2,332,438

UNITED STATES PATENT OFFICE 2,332,438

AUTOMATIC WEIGHING MACHINE

John P. Clifford, Passaic, N. J., assignor to Richardson Scale Company, Clifton, N. J., a corporation of New Jersey Application December 26, 1939, Serial No. 311,029

17 Claims. (Cl. 249—42)

The present invention relates to weighing machines, and more particularly to those of the automatic type in which the material to be weighed is fed into and the weighed material is discharged from the weigh hopper or other container under control of the weighing mechanism.

One of the primary objects of the invention is to provide an improved weighing machine of this class whereby the material is weighed as it is introduced into a hopper or container and it is weighed as it is discharged or removed therefrom. The invention is thus particularly advantageous as applied to the weighing of liquids or other materials which have a tendency to adhere to the walls of the weigh hopper or container, it avoiding the loss of time and inconvenience of cleaning and draining the weigh hopper or container in order to arrive at a true weight, as in weighing machines of the usual type in which the entire contents of the weigh hopper must be discharged at each weighing.

A more particular object is to provide a novel and improved scale system and associated control devices for the feed and discharge of the material whereby the elements of the scale system are utilized to automatically control the feed and weighing in of the incoming material and the discharge and weighing out of the material without affecting the accuracy of the scale system.

Another object is to provide relatively simple and effective means for interlocking the machine so as to prevent operation thereof unless there is a sufficient supply of material to be fed into the machine.

A further object of the invention is to provide simple and effective means for interlocking the controls of the machine whereby feed of material to the weigh hopper or container is prevented except while the discharge of material therefrom is cut off, and discharge of material from the weigh hopper is prevented except while the feed of material thereto is cut off.

To these and other ends the invention consists in certain improvements and combinations and arrangements of parts all as will be hereinafter more fully described, the features of novelty being pointed out particularly in the claims at the end of this specification.

In the accompanying drawings.

Similar parts are designated by the same reference characters in the several figures.

The invention is shown in the present instance in its preferred form and as applied to the weighing of liquids. It is to be understood however that the invention is not restricted to the particular construction shown as equivalent constructions are contemplated and will be included within the scope of the claims, and that the invention is applicable not only to the weighing of liquids but is also applicable to the weighing of powdery or other materials which are capable of flowing.

According to the present invention, the material to be weighed is weighed into and weighed out of a weigh hopper or container which is suspended or supported by scale mechanism which comprises two separate and distinct weigh beams, one suspended from the other, one of these weigh beams being weighted to balance a gross load of material introduced into the weigh hopper and the other weigh beam being weighted to balance a tare load or residue to remain in the weigh hopper, and controlling devices are provided which are governed by the weigh beams so that the introduction of material into the weigh hopper will be cut off when a predetermined gross load has been introduced therein, and the discharge of material from the weigh hopper will be cut off when the desired or predetermined net load of material has been discharged, the material being thus weighed into the weigh hopper and also weighed out of the weigh hopper. The controlling devices, governed by the weigh beams, are so connected that the cycle of operation of the machine will take place automatically and will be repeated, without requiring the attention of an attendant, except for primary and incidental adjustments of the machine.

Figure 1:
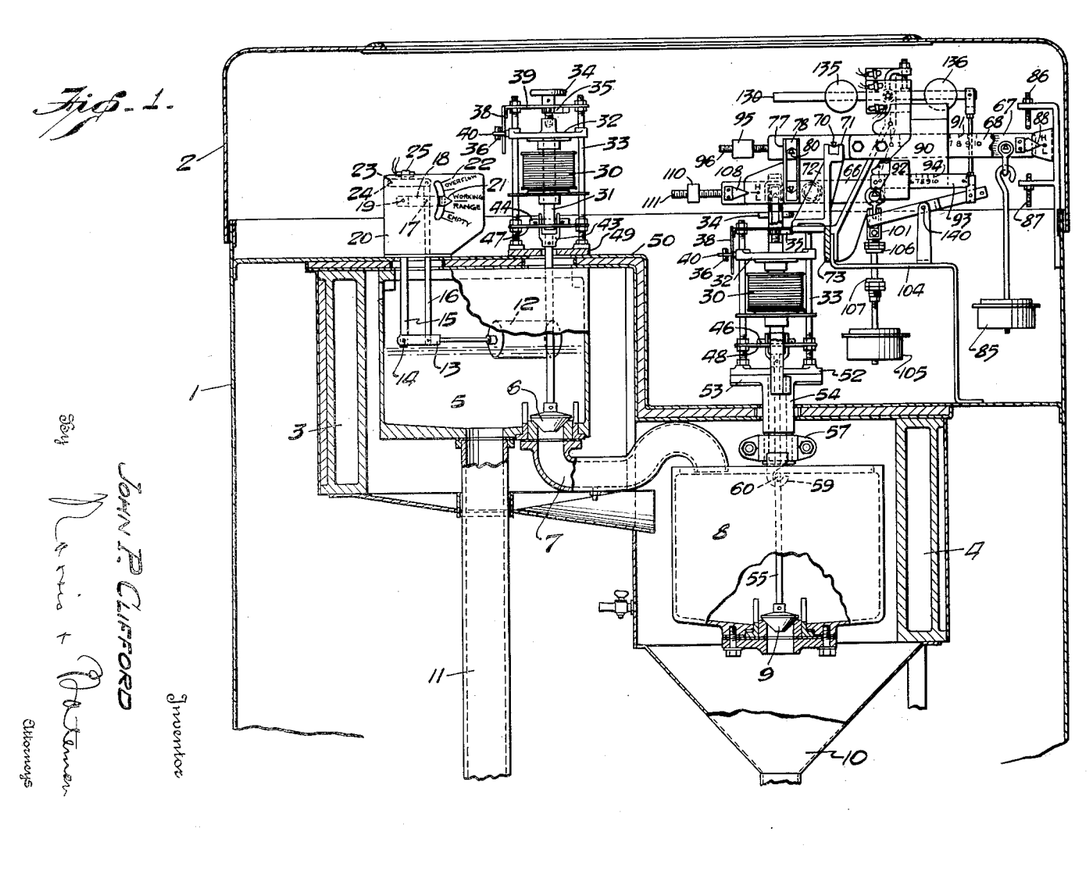
Fig. 1 is a vertical section of a weighing machine embodying the present invention.

As shown in the present instance, the machine is preferably supported and enclosed in a suitable casing 1 having a hinged or removable lid 2 which provides access to the machine. The machine comprises a feed tank 5 having a feed valve 6 in the bottom thereof to control the feed of material to a spout 7, and a weigh hopper or container 8 into which the spout 7 feeds the material, the weigh hopper having a discharge valve 9 in the bottom thereof for controlling the discharge of material therefrom into a spout 10 from which the material may be conducted to any desired point of use or storage. The feed tank 5 and weigh hopper 8 may be provided with jackets 3 and 4 respectively for the circulation of a heating medium such as steam or of a refrigerant when liquids are being weighed the nature of which is such as to render heating or cooling thereof desirable. The material is supplied to the feed tank 5 by a conduit 11, gravity or pump means being provided to supply the material, such as liquid, to this conduit, and the feed tank is provided with a float 12 which is attached to a lever 13 which is pivotally mounted at 14 on a relatively fixed arm 15 which extends down into this tank from the top thereof, the float 12 rising and falling with variations in the level of the liquid or material in the feed tank. The float lever 13 is pivotally connected to a rod 16, this rod being pivotally connected at 17 to an arm 18 which is pivoted at 19 to a relatively fixed bracket 20, this arm having a pointer 21 which is exposed at the front of the bracket 20 and cooperates with a suitable scale 22 to indicate whether the level of liquid in the feed tank is within the working range or at a higher or overflow level, or whether the feed tank is empty. The float operated rod 16 is also pivotally connected at its upper end to a lever 23 which is pivoted at 24 to the bracket 20, the lever 23 carrying a mercury switch 25 the function of which will be hereinafter described.

The feed valve 6 for the feed tank and the discharge valve 9 for the weigh hopper are each operated by a solenoid the construction of each of which is similar, so that a description of one will suffice for both. Each of these solenoids comprises a coil 30 and an armature 31 movable vertically therein. The coil 30 is supported by a plate 32 which is slidable vertically on and guided by a suitable number of vertical rods 33, this plate and the coil being adjusted vertically by a hand screw 34 which is threaded in the top of the plate 32 and is provided with a ratchet 35 for maintaining it at different adjustments. An indicating arm or pointer 36 is pivoted at 37 on a plate 38 which is fixed to the top plate 39 which supports the adjusting screw 34 and is slotted to engage a pin 40 on the vertically adjustable plate 32 so that as the latter is raised or lowered the pointer will swing upwardly or downwardly, and this pointer cooperates with a suitable scale 41 on the relatively fixed plate 38. An abutment 42 extends downwardly into the coil 30 to form a stop against which the armature may abut, and by adjusting the height of the coil 30 by manipulation of the screw 34, the height of this abutment and hence the limit of upward movement of the armature and, accordingly, the extent of opening of the feed or discharge valve, may be regulated. The upper end of the stem of the feed valve 6 is operatively connected by a clevis 43 and pin 44 to the armature of its respective solenoid, and the upper end of the stem of the discharge valve 9 is operatively connected by a clevis 45 and pin 46 to the armature of its respective solenoid, the pin 44 or 46 preferably operating in a slot in the respective clevis 43 or 45 to insure complete closing of the respective feed or discharge valve, and the descent of the respective armatures being limited by the engagement of the pins 44 and 46 with vertically adjustable stop plates 47 and 48.

The solenoid for the feed valve 6 is mounted in a relatively fixed position above the feed tank 5, as by securing the rods 33 in a plate 49 and mounting this plate on a transverse relatively fixed partition 50 connected to the sides of the casing.

Figure 4:
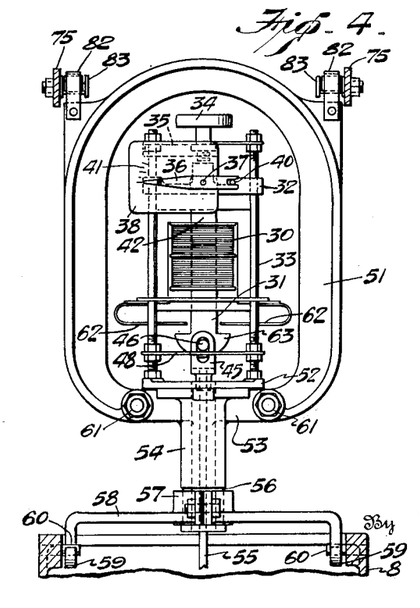
Fig. 4 is an elevation, partly in section of the means for suspending the weigh hopper from the scale mechanism, and the means for operating the discharge valve therefor.

The solenoid for the discharge valve 9, as shown more particularly in Fig. 4, is carried by a yoke 51 which suspends the weigh hopper from the weighing mechanism, the base plate 52 in which the lower ends of the rods 33 of this solenoid are secured being fixed to the top of a bracket 53 which has a hollow sleeve 54 through which the stem 55 of the discharge valve extends vertically, and the lower end of the sleeve 54 is formed with a circumferential groove 56 in which a clamp 57 is secured, this clamp having arms 58 which extend in opposite directions therefrom and are provided with hooks 59 which engage pins 60 on opposite sides of the weigh hopper and thereby suspend the latter. The yoke 51 is bolted or otherwise secured, as at 61, to the bracket 53, and this yoke, which may conveniently encircle the solenoid, is suspended from the weighing mechanism. In order to minimize disturbance of the accuracy of the weighing operation, incident to operation of the discharge valve by its solenoid, a pair of springs 62 are provided against which a head 63 on the armature may engage when the solenoid is energized to open the discharge valve, thereby arresting the opening movement of the discharge valve without shock.

Figure 2:
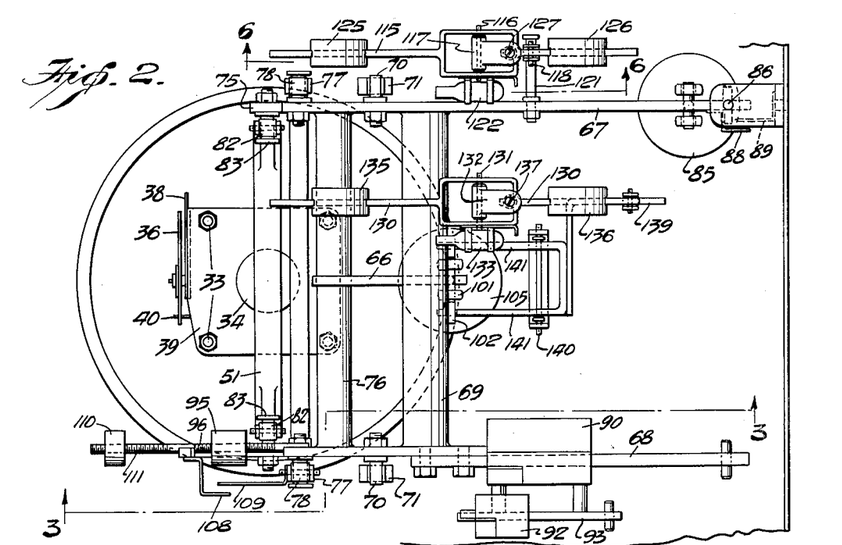
Fig. 2 is a top plan view, on an enlarged scale, of the scale mechanism of the machine.
Figure 3:
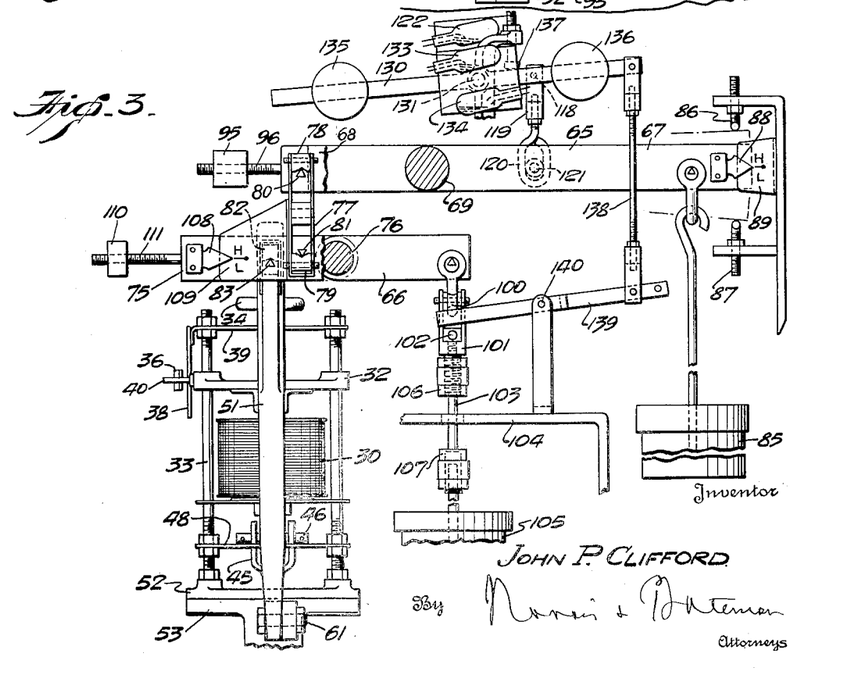
Fig. 3 is a vertical section taken on the line 3—3 in Fig. 2.

The weighing mechanism, according to the present invention, comprises a pair of separate and distinct main and auxiliary weigh beams 65 and 66 respectively. The beam 65, which preferably comprises a pair of side members 67 and 68 rigidly connected by a cross member 69, is fulcrumed by knife edges 70 on bearings 71, the latter being supported in relatively fixed position in the machine as by bearing brackets 72 rigidly mounted on a relatively fixed cross member 73. The weigh beam 66, which is below the beam 65, and which also preferably comprises a pair of side members 75 rigidly connected by a cross member 76, is suspended from the load end of the weigh beam 65 by a pair of shackles 77 each having a bearing 78 in its upper end and a bearing 79 in its lower end which engage knife edges 80 and 81 on the beams 65 and 66 respectively. The yoke 51 which supports the weigh hopper 8, is suspended from the side members 75 of the weigh beam 66 by bearings 82 which rest on knife edges 83 and are secured to the upper end of the yoke 51 at the respective sides thereof. By this arrangement, the weigh hopper is supported from the weigh beam 65, the latter being fulcrumed on the relatively fixed bearings 71 by the knife edges 70.

Figure 5:
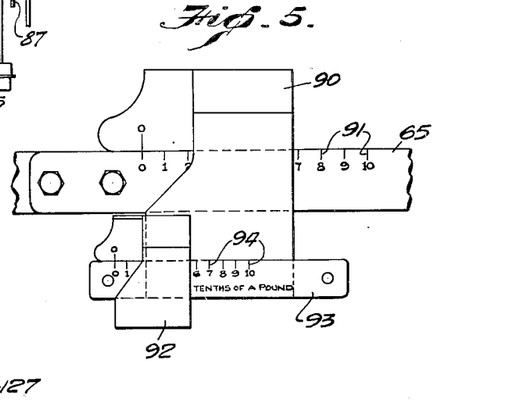
Fig. 5 is a side elevation of the poise for the main weigh beam.
Figure 6:
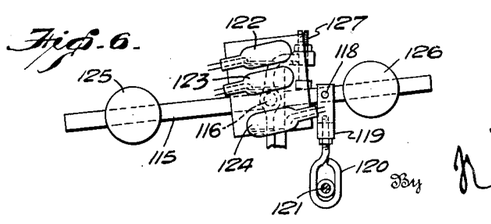
Fig. 6 is a detail section taken on the line 6—6 in Fig. 2.

The beam 65 is provided at its free end with a weight pan 85 and with adjustable stops 86 and 87, and it is also preferably provided with a pointer 88 to cooperate with a relatively fixed indicator plate 89 to show when this beam is in balance or when the load thereon is heavy or light. The side member 68 of the beam 65 is also provided with an adjustable poise which comprises a main poise weight 90 which is slidable on the member 68, its position thereon being indicated by graduations 91, which may be in pounds, and an auxiliary poise weight 92 is slidable on a bar 93 fixed to the main poise weight and is adapted to cooperate with a scale 94 which may be graduated for example in tenths or other desired fractions of a pound. A fine adjustment weight 95 is mounted on a screw 96 on the opposite or load end of the beam 65. The weigh beam 66 is provided at its free end with a shackle 100 which suspends a yoke 101, this yoke having a pin 102 projecting laterally therefrom, and the yoke is secured to the upper end of a rod 103 which extends downwardly through a relatively fixed plate 104 and is provided at its lower end with a weight pan 105. The rod 103 is provided, above and below the plate 104, with collars 106 and 107, these collars being arranged to cooperate with the plate 104 and thereby limit the upward and downward movements of the weight carrying end of the weigh beam 66. The other end of the beam 66 preferably carries a pointer 108 which cooperates with an indicator plate 109 which may be fixed to one of the shackles 77 and may bear a scale to indicate when this weigh beam is in balance or when the load in the weigh hopper is heavy or light. This end of this weigh beam may also be provided with a fine adjustment weight 110 threaded on a screw 111 projecting from this end of this weigh beam.

The operations of the feed and discharge valves are controlled automatically by the weigh beams 65 and 66. For this purpose, a lever 115 is pivoted at 116 on a relatively fixed bracket 117, this lever being pivotally connected at 118 to a link 119 the lower end of which is provided with a loop 120 in which a pin 121 on the side member 67 of the beam 65 operates. The lever 115 carries a set of three mercury switches 122, 123 and 124 which rock in unison with the rocking movements of the lever 115. The switches 122 and 123 have their electrodes so located as to cause these switches to be closed when the free or weight carrying end of the beam 65 is in its balanced position or is above that position, the electrodes of the switch 124 being so located that under these conditions this switch will be opened, and when the free or weight carrying end of the beam 65 descends below its balanced position, the switches 122 and 123 will be opened and the switch 124 closed. The lever 115 is provided with weights 125 and 126 which are adjustable so as to cause the lever 115 to normally rest against an adjustable screw or stop 127. As the pin 121 descends, it engages the loop 120 of the link 119, thereby tilting the lever 115 and the switches thereon, but as the beam 65 rises and approaches a balance, the lever 115 comes to a stop against the adjustable screw or abutment 127, thereby leaving the beam 65 free to balance without impediment. When the pin 121 descends with the beam 65, switches 122 and 123 open and the switch 124 closes, and when the pin 121 rises with the beam 65, indicating a balanced condition, switch 124 opens and switches 122 and 123 close.

The valve controlling means governed by the weigh beam 66 comprises a lever 130 which is pivoted at 131 to a relatively fixed bracket 132, this lever carrying a pair of mercury switches 133 and 134 having their electrodes in relatively reversed relation, and this lever is provided with weights 135, 136 which are adjustable so that the lever 130 will normally rest against a screw or other adjustable stop 137. The lever 130 is operatively connected by a link 138 to one end of a lever 139 which is pivoted at 140 on a bracket supported by the stationary plate 104, the other end of this lever being formed as a pair of arms 141 which straddle the fork 101 and are engageable by the pin 102 when the weighted end of the beam 66 rises. As the pin 102 rises incident to ascent of the weighted end of the beam 66, it engages the lever 139 and pulls the link 138 downwardly to tilt the switches 133 and 134 mounted on the lever 130, causing the switch 133 to open and the switch 134 to close, and in the balancing movement of the beam 66, the lever 130 comes to a stop against the screw 137, leaving the beam 66 free to balance without impediment, and as the pin 102 descends with the beam 66 as the latter assumes a balanced condition, the switch 133 closes and the switch 134 opens.

Figure 10:
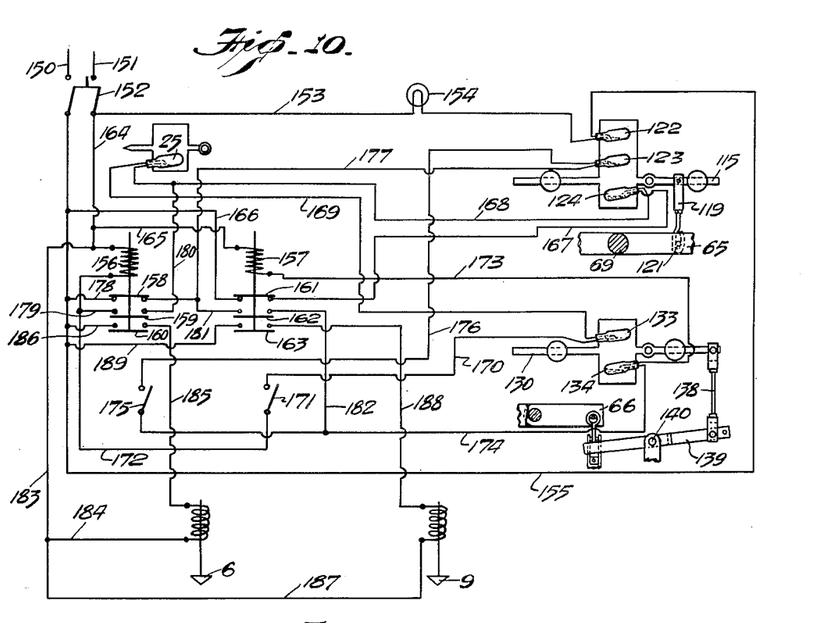
Fig. 10 is an electrical diagram showing the connections between the controlling elements of the machine.

Fig. 10 shows the electrical connection between the elements of the machine, the circuits being suitable for either alternating or direct current of any reasonable potential as, for example, a 110 volt 60 cycle single phase current. In this diagram 150 and 151 represent line wires leading from a suitable source of supply, 152 a manual control switch for controlling the supply of current to the machine, 153 is a conductor leading from one side of the control switch to one electrode of the mercury switch 122, this conductor including an electric signal such as an incandescent lamp 154, and 155 is a conductor leading from the other electrode of the switch 122 to the other side of the control switch 152. 156 and 157 represent the coils of electromagnetic relays for the feed and discharge valves 6 and 9 respectively, the switch 156 embodying contactors 158, 159 and 160 and the relay 157 comprising contactors 161, 162 and 163. The contactors 158 and 161 are closed and the contactors 159, 160 and 162, 163 are opened when the respective relays are deenergized; and the contactors 158 and 161 are opened and the contactors 159, 160 and 162, 163 are closed when the respective relays are energized. The coils 156 and 157 of these relays are connected to one terminal of the control switch 152 by conductors 164 and 165. The coil 156 is adapted to be connected to the other terminal of the control switch 152 by a conductor 166, contactor 161, conductor 167 connected to one electrode of the switch 124, conductor 168 leading from the other electrode of said switch to one electrode of the switch 25, conductor 169 leading from the other electrode of the latter switch to one electrode of the switch 133, conductor 170 leading from the other electrode of the latter switch to a residue or tare test switch 171, and conductor 172 leading from the latter to the coil 156. The relay coil 157 is connected to the other terminal of the control switch 152 by a conductor 173 leading therefrom to one electrode of the switch 134, conductor 174 leading from the other electrode of said switch to a feed test switch 175, conductor 176 leading from the latter to one electrode of the switch 123, conductor 177 leading from the other electrode of the latter switch to the contactor 158, and conductor 178 leading from the latter to the control switch. Contactor 159 is a holding contactor for the respective relay, it being connected to the respective relay coil 156 by conductor 179 and to conductor 168 by conductor 180, and contactor 162 is a holding contactor for the relay coil 157, it being connected to the respective relay coil by conductor 173, switch 134, conductors 174 and 182 to contactor 162 and through conductor 181 to contactor 158 and completes the circuit through conductor 178. The solenoid coil for the feed valve 6 is connected to one terminal of the control switch 152 by conductors 164, 183 and 184 and is adapted to be connected to the other terminal of the control switch by conductor 185, contactor 160 and conductor 186. The solenoid for the discharge valve 9 is connected to one terminal of the control switch 152, through conductors 164, 183 and 187 and to the other terminal of the control switch by conductor 188, contactor 163 and conductor 189.

The operation of an automatic weighing machine constructed as hereinbefore described is as follows: The lower tare or residue beam 66 is balanced against the empty tank, and the upper or gross weighing beam 65 is balanced against the empty tank, lower beam and other elements suspended from its load end. Sufficient weight is then placed on the weight pan 105 of the tare beam 66 to balance the tare or residue which it is desired to retain in the weigh hopper after the discharge of the net weight of material therefrom, and sufficient weight is placed on the weight pan 85 of the gross weighing beam 65 to balance the desired net weight of material plus the residue material or tare which is to remain in the weigh hopper. Such weighting of the beams 65 and 66 will cause their weighted ends to descend onto the stops 87 and 104 respectively, and to close switches 124 and 133 and open switches 122, 123 and 134.

Figure 7:
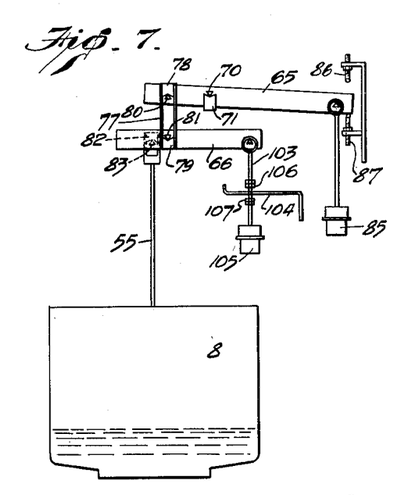
Figs. 7, 8 and 9 are diagrammatic views showing the different positions of the weigh beams during the cycle of operation of the machine.
Figure 8:
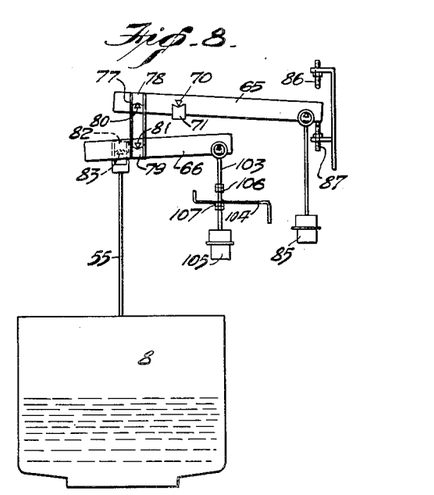
Figure 9:
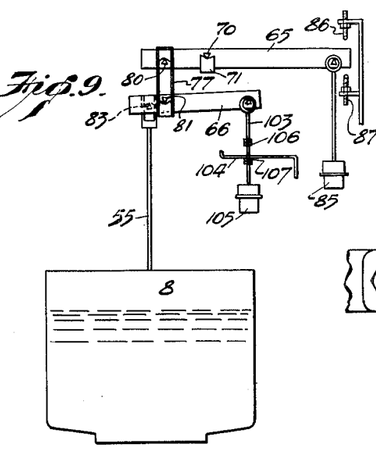

The supply of liquid or other material is turned into the machine so that it flows into the feed tank 5 through the conduit 11, and the manually operated control switch 152 is closed, as are also the test switches 171 and 175. Until the liquid reaches a predetermined level in the feed tank 5, switch 25 remains open, and no action takes place since all circuits are then open. However, as soon as the liquid reaches a sufficient level in the feed tank 5 to cause the float 12 therein to rock the switch 25 into closed position, the relay 156 is energized and the feed valve 6 is opened to cause the liquid to flow from the feed tank 5 through the spout 7 into the weigh hopper 8 by the closing of a circuit from one terminal of the control switch 152 through conductor 166, contactor 161, conductor 167, switch 124, conductor 168, switch 25, conductor 169, switch 133, conductor 170, test switch 171, conductor 172, feed relay coil 156 and conductor 164 to the other side of the control switch. The energizing of the feed solenoid coil 156 opens the contactor 158 but closes the contactors 159 and 160. The contactor 159 is a holding contact, and when the relay coil 156 is energized, its circuit is completed through the conductor 166, contactor 161, conductor 167, switch 124, conductor 168, conductor 180, contactor 159 and conductor 179 to feed relay coil 156 and, through the latter and conductor 164, to the other terminal of the control switch 152. The contactor 160, when engaged by the energizing of the feed relay coil 156, completes a circuit from one terminal of the control switch 152, through conductors 164, 183 and 184, through the solenoid of the feed valve 6, thence through conductors 185, contactor 160 and conductor 186 to the other terminal of the control switch 152, thereby energizing the solenoid for the feed valve 6 and causing this valve to open. Liquid then flows into the weigh hopper 8, and as this hopper fills to the point of overbalancing the tare beam 66, the weighted end of this beam rises until the collar 107 thereon engages the stop plate 104, during which operation the switch 133 opens and the switch 134 closes. The relative position of the weigh beams at this time will be as shown in Fig. 8. The feed valve 6 will be held open by the holding contact 159 which maintains the feed valve relay 156 in energized condition, until a balanced condition is reached on the beam 65, as indicated in Fig. 9. The consequent rising of the weighted end of this beam causes the switch 124 to open and the switch 123 to close. The opening of the switch 124 breaks the circuit through the feed relay coil 156, thereby deenergizing this relay and consequently deenergizing the solenoid of the feed valve 6 by opening of the contactor 160. The closing of the switch 123 energizes the discharge relay coil 157 from one terminal of the control switch 152 through conductors 164 and 165, relay coil 157, conductor 173, switch 134, conductor 174, test switch 175, conductor 176, switch 123, conductor 177, contactor 158 and conductor 178 to the other terminal of the control switch 152, the feed relay coil 156 being then deenergized. The energizing of the discharge relay coil 157 opens the contactor 161 and closes the contactors 162 and 163. The contactor 162 is a holding contactor and the closing thereof maintains the discharge relay coil 157 energized through conductor 165, relay coil 157, conductor 173, switch 134, conductors 174 and 182, contactor 162, conductor 181, contactor 158 and conductor 178 to the other terminal of the control switch 152. The closing of the contactor 163 closes the circuit through the solenoid for the discharge valve 9 through the conductors 164, 183 and 187 from one terminal of the control switch 152, through the solenoid coil for the discharge valve, thence through conductor 188, contactor 163 and conductor 189 to the other terminal of the control switch 152, thereby opening the discharge valve. The liquid then discharges from the weigh hopper 8 and the weigh beam 65 drops onto its stop 87, as shown in Fig. 8, closing the switch 124 and opening the switch 123. At this time, the circuit through the feed relay coil 156 and the solenoid for the feed valve 6 is open so that the feed valve is closed, but the circuit for the discharge relay coil 157 and the solenoid for the discharge valve 9 remain closed so that the discharge valve 9 remains open and the liquid continues to discharge from the weigh hopper 8 until the beam 66 comes to a balanced condition with residue liquid or tare left in the weigh hopper, such tare being equal to the weight placed upon the weight pan 105, and the beam at this time occupying the positions represented in Fig. 7. As the beam 66 drops to balance, the switch 133 closes and the switch 134 opens. Opening of the switch 134 opens the circuit through the discharge relay coil 157, thereby causing the holding contactor 162 to open and thereby break the circuit through the solenoid of the discharge valve 9 causing the latter to close, and at the same time, the closing of the switch 133 completes the circuit previously described through the feed relay coil 156, thereby energizing this relay and closing the circuit through the solenoid of the feed valve 6 whereby the feed valve is again opened to feed the liquid into the weigh hopper for the next weighing.

The cycle of operation of the machine is thus completed and this cycle is repeated automatically until interrupted in one or another of the following ways. The float operated switch 25 will remain closed and the circuit for the solenoid of the feed valve 6 may be completed therethrough as long as there is sufficient liquid or material in the feed tank 5 to supply the machine. If however the level of the liquid in the feed tank drops below a predetermined point, the switch 25 will open. The feed relay coil 156 however will not be immediately deenergized as the circuit through this coil will be maintained by the holding contact 159, which bridges the switch 25, until the switch 124 opens upon the completion of a weighing. The machine will discharge the load of liquid or material thus weighed, but a new weighing will not commence until the switch 25 closes again, indicating that there is sufficient material in the feed tank to complete another cycle. During the discharge operation, switch 124 will close and when discharge is completed and beam 66 is in balance condition, switch 134 will open. The circuit of the discharge relay coil 157 will thus be opened by the switch 134, thereby deenergizing the solenoid of the discharge valve 9 and causing the latter to close, but the feed relay coil 156 will not be energized although the switch 124 is closed, because the switch 25 is open. Closing of the switch 25 however completes the circuit for the energizing of the feed relay coil 156.

The test switches 171 and 175 are manually operated, and are employed to open the circuits and prevent operation for the purpose of testing the machine for balance or true weighings. When the test switch 171 is open, it will stop the machine from further action when a tare or residue load of material is in the weigh hopper 8. When the feeding once starts, the feed relay holding contact 159 is closed, and although the test switch 171 might be opened while the feed valve 6 is open, feeding will continue and discharge of the material from the weigh hopper 8 will take place, but a new filling of the weigh hopper would not take place since the feed relay coil 156 cannot be energized until the test switch 171 is closed. The test switch 175, when opened, will stop the machine when a full gross load is in the weigh hopper 8. When the discharge of material from the weigh hopper commences, the holding contactor 162 of the discharge relay closes, and although the test switch 175 might be opened while the discharge valve 9 is open, discharge of the material from the weigh hopper will continue and a new filling will take place. However, as soon as the weigh hopper 8 is filled, the machine will stop with the weigh hopper full, so that the gross weighing may be tested, and upon closing of the test switch 175, the cycle of operation of the machine will continue.

The electric lamp 154 in the circuit of the switch 122, which is illustrated when this switch is closed, indicates that the weigh hopper 8 is fully loaded and the beam 65 is in full balanced position, it being noted that the switch 122 closes when the weighted end of said beam rises to balanced position and is opened when said end of this beam descends below that position.

Since the energizing of the feed relay coil 156 depends on completion of its circuit through the contactor 161 of the discharge relay while the latter is deenergized, and the energizing of the coil 157 of the discharge relay depends on completion of its circuit through the contactor 158 of the feed relay while the latter is deenergized, an interlock is thus provided which precludes opening of either the feed or discharge valve until after the other valve has closed, and hence both of these valves can not be open at the same time. Although relays such as those shown and solenoids are preferably employed to control the feed and discharge because of their simplicity and the advantage that they enable the current flow through the mercury switches to be reduced, it will be understood that the invention is not limited thereto.

The provision of the separate and distinct free operating weigh beams and the valve controlling means associated therewith enables a load of liquid or other material to be weighed into the weigh hopper and the same load to be weighed out of the weigh hopper automatically or without requiring any manipulation by an attendant. An important advantage of such operation is obtained especially in the weighing of liquids or other materials which have a tendency to adhere temporarily to the side and bottom walls of the weigh hopper, the bringing of the weighing mechanism to a tare balance, leaving a portion of the gross load in the weigh hopper at the end of each cycle of weighing, insuring rapid and accurate weighing of the loads without the delay and inconvenience that results in weighing such materials in the ordinary way and which requires cleaning and draining of the weigh hopper to arrive at a true weight. Moreover, the system of weigh beams employed according to the present invention enables the true weights of the gross load and of the tare load to be determined at each cycle and the difference between the two conditions indicated.

By employing the correct ratios of the two beams it is possible to balance any load in the weigh hopper on the two separate beams, so that one beam will be a check against the other. It will be noted that by providing the stop 107 for the beam 66, the ratio of this beam changes automatically during operation of the beams without however changing the resultant load hanging by the shackles 77 from the beam 65. For example, assuming the beam 66 has a ratio of 5 to 1, when this beam is in balance condition with the stop 107 away from stop 104, the resultant load hanging from the beam 65 is the weighed load plus the weights or poise on the beam 66 at the ratio of 5 to 1, and when the beam 66 rises and the stop 107 is against the stop 104, the resultant load hanging fom the beam 65 is the weighed load only but at a ratio of 5 to 6. For instance, assuming the leverage of the beam 66 to have a ratio of 5 to 1, and letting L represent the resultant load, W the weighed load and w the weighing weights the equation, in the balance condition of the beam 66 is:

$$L = W + w$$

and in the unbalanced condition of the beam 66 with the stop 107 against the stop 104, the equation is $$L = \frac{W \times 6}{5}$$

By appropriately adjusting the poise or weight on the beam 65, the load on the beam 66 may then be balanced and its weight thereby checked by the beam 65. Obviously, the disposition of the load in the weigh hopper has no effect upon the true leverage and balance of either of the weigh beams.

By employing the separate and distinct weigh beams and their associated feed and discharge controlling devices governed thereby, one of these beam controls the weighing of a load into the weigh hopper and the other beam controls the weighing of the same load out of the weigh hopper, each beam operating free of the other so that neither affects the accuracy of the other. The combined system of beams and their associated controlling devices enables the sequence of operations constituting the weighing cycle to be performed automatically and to be continued so long as there is a sufficient supply of liquid or material.

I claim as my invention:

1. An automatic weighing machine comprising a container, means for feeding material into the container, means for discharging material from the container, main and auxiliary weigh beams conjointly supporting the container, the auxiliary beam being mounted pivotally on the main beam to balance thereon, means governed by the main beam and controlling the feeding means to weigh material into the container, and means governed by the auxiliary beam and controlling the discharging means to weigh material out of the container.

2. An automatic weighing machine comprising main and auxiliary weigh beams, the auxiliary beam being fulcrumed on the main beam to balance freely thereon, a container supported on said auxiliary beam, means for feeding material into the container for weighing therein, means for discharging such material from the container, means governed by the main beam for controlling the feeding means, and means governed by the auxiliary beam for controlling the discharging means.

3. An automatic weighing machine comprising a gross weighing beam and a tare beam fulcrumed on said gross weighing beam to balance freely thereon, a container supported by said tare beam, means connected to and governed by the gross weighing beam for introducing material into the container, and means connected to and governed by the tare beam for discharging material from the container.

4. An automatic weighing machine comprising a container, a pair of weigh beams conjointly supporting said container, one of said beams having a pivotal support on the other beam to balance freely thereon and having a load influence on said other beam solely at said pivotal support, means connected to and governed by one of said beams for introducing material into the container, and means connected to and governed by the other beam for discharging material from the container, said beams, while in balanced condition, being disconnected from said means for introducing material into and discharging it from the container.

5. An automatic weighing machine comprising a gross weighing beam, a tare beam fulcrumed on and suspended as a load from the gross weighing beam to balance freely thereon, a container suspended from the tare beam, feed means for introducing material into the container, means for discharging material from the container, means governed by the gross weighing beam for controlling the feed means, and means governed by the tare beam for controlling the discharge means.

6. An automatic weighing machine comprising a pair of weigh beams, one of said beams being fulcrumed on and supported as a load by the other beam to balance freely thereon, a container supported conjointly by said beams, a feed device for introducing material into the container and a discharge device for discharging material therefrom, devices governed by the second mentioned beam for controlling said feed device to interrupt the feed of material when a load thereof is balanced by said second mentioned beam, and devices governed by the first mentioned beam for controlling said discharge device to interrupt discharge of the material when the load thereof weighed by said second mentioned beam has been discharged.

7. An automatic weighing machine comprising main and auxiliary weigh beams, a container supported conjointly by said beams, the auxiliary beam supporting the container and being fulcrumed to balance as a load on the main beam, electro-magnetically controlled means for feeding material into and discharging the same from said container, means including electrical circuits and switches governed by the main and auxiliary beams for controlling said feeding and discharging means respectively, and means in said electrical circuits for governing said controlling means to effect sequential operations of said feeding and discharging means.

8. An automatic weighing machine comprising a gross weighing beam, a tare beam fulcrumed thereon, a container supported on the tare beam, electro-magnetically controlled means for feeding material into and discharging the same from the container, and means including electrical circuits and switches governed by the respective beams for automatically cutting off the feed of material to the container when the gross weighing beam comes to a balance and for cutting off the discharge of material from the container when the tare beam comes to balance.

9. An automatic weighing machine comprising a gross weighing beam, a tare beam fulcrumed thereon, a container supported on the tare beam, electro-magnetically controlled means for feeding material into and discharging the same from the container, means including electrical circuits and switches governed by the respective beams for automatically cutting off the feed of material to the container when the gross weighing beam comes to a balance and for cutting off the discharge of material from the container when the tare beam comes to balance, and interlocking means in said electrical circuits for preventing operation of either the feeding or discharging means while the other of said means is in operation.

10. An automatic weighing machine comprising main and auxiliary weigh beams, the auxiliary beam being fulcrumed on the main beam as a load to balance freely thereon, a container supported conjointly by said beams, electro-magnetically controlled means for feeding material into and discharging the same from said container, means including electrical circuits and switches governed by the main and auxiliary beams for controlling said feeding and discharging means respectively, a source of supply of material for the feeding means, and means connected in circuit with said feeding means for controlling the operation of the machine in accordance with said source of supply.

11. An automatic weighing machine comprising a gross weighing beam, a tare beam fulcrumed thereon, a container supported on the tare beam, electro-magnetically controlled means for feeding material into and discharging the same from the container, means including electrical circuits and switches governed by the respective beams for automatically cutting off the feed of material to the container when the gross weighing beam comes to a balance and for cutting off the discharge of material from the container when the tare beam comes to balance, a source of supply of material, and means in said electrical circuits and governed by said source of supply for controlling the feeding means.

12. An automatic weighing machine comprising a container, a pair of relatively free weigh beams supporting said container and having means for independently balancing different loads therein, one of said beams being fulcrumed on the other beam to balance as a load thereon, electro-magnetically controlled means for feeding material into and discharging the same from the container, means including electrical circuits and switch means governed by one of said beams for causing operation of the feeding means to feed material into the container when the other beam balances and to interrupt the operation of the feeding means when a gross load has been fed into the container, and switch means governed by the other of said beams for causing operation of the discharging means to discharge material from the container when said gross load has been fed into it and for interrupting the operation of the discharging means when a predetermined residue of material remains in the container.

13. An automatic weighing machine comprising a gross weighing beam, a tare beam fulcrumed thereon, a container supported on the tare beam, electro-magnetically controlled means for feeding material into and discharging the same from the container, means including electrical circuits and switch means governed by the gross weighing beam for causing operation of the feeding means to feed material into the container when the tare beam balances and for interrupting the operation of the feeding means when the gross weighing beam balances, and means in said circuits including switch means governed by the tare beam for causing operation of the discharging means when the gross weighing beam balances to discharge material from the container and for interrupting the operation of the discharging means when the tare beam comes to balance with a tare residue in the container.

14. An automatic weighing machine comprising a gross weighing beam, a tare beam fulcrumed thereon, a container supported on the tare beam, electro-magnetically controlled means for feeding material into and discharging the same from the container, means including electrical circuits and switch means governed by the gross weighing beam for causing operation of the feeding means to feed material into the container when the tare beam balances and for interrupting the operation of the feeding means when the gross weighing beam balances, means in said circuits including switch means governed by the tare beam for causing operation of the discharging means when the gross weighing beam balances to discharge material from the container and for interrupting the operation of the discharging means when the tare beam comes to balance with a tare residue in the container, and intercontrolling means in said circuits for coordinating the feeding and discharging means for sequential and repeated operations.

15. An automatic weighing machine comprising a pair of weigh beams, one of said beams being pivotally supported by the other beam and having means for supporting a load thereon and means for counterbalancing such load, and means for changing the ratio of leverage of said load supporting beam while the point of application of its entire influence on the other beam remains unchanged.

16. An automatic weighing machine comprising a main beam, an auxiliary beam having means toward its respective ends for supporting a load and counterweighting means therefor and having a fulcrum intermediately of its ends supporting it as a load from the main beam, and means operative by the unbalancing of the auxiliary beam to change the ratio of its leverage while its load influence upon the main beam is exerted thereon solely through said supporting fulcrum.

17. An automatic weighing machine comprising a gross weighing beam, a tare beam having a fulcrum at a point intermediately of its length supporting it from the gross weighing beams and carrying load supporting and load counterweighting means toward its respective ends, and a stationary stop operable to limit the rise of the counterweighted end of the tare beam and thereby alter the ratio of leverage of the tare beam.

JOHN P. CLIFFORD.